(12) United States Patent
Vyhmeister et al.

(10) Patent No.: US 11,570,505 B2
(45) Date of Patent: Jan. 31, 2023

(54) MEDIA PLAYBACK SYNCHRONIZATION OF MULTIPLE PLAYBACK SYSTEMS

(71) Applicant: Charter Communications Operating, LLC, St. Louis, MO (US)

(72) Inventors: Cristian G. Vyhmeister, Franktown, CO (US); Horatio Derrick Kipchoge Boothe, Denver, CO (US); John Sweet, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/352,567

(22) Filed: Jun. 21, 2021

(65) Prior Publication Data

US 2022/0408146 A1    Dec. 22, 2022

(51) Int. Cl.
*H04N 21/43*    (2011.01)
*H04N 21/472*    (2011.01)
*H04N 21/439*    (2011.01)

(52) U.S. Cl.
CPC ........... *H04N 21/43072* (2020.08); *H04N 21/4394* (2013.01); *H04N 21/47217* (2013.01)

(58) Field of Classification Search
CPC ......... H04N 21/43072; H04N 21/4394; H04N 21/47217; H04N 21/4312; H04N 21/4307; H04N 21/4223; H04N 21/42203; H04N 21/2187; H04H 60/58
USPC ........................................................ 348/515
See application file for complete search history.

(56) References Cited

U.S. PATENT DOCUMENTS

| | | | |
|---|---|---|---|
| 5,583,652 A * | 12/1996 | Ware | H04N 7/56 386/206 |
| 9,596,502 B1 * | 3/2017 | Abecassis | H04N 21/4781 |
| 9,628,831 B2 * | 4/2017 | Koum | H04N 21/25858 |
| 11,178,447 B1 * | 11/2021 | Panter | H04N 21/2187 |

(Continued)

OTHER PUBLICATIONS

Devin, Coldeway, Actiview aims to streamline move accessibility for millions of hearing and vision impaired:, Jun. 13, 2017, pp. 1-19.

(Continued)

*Primary Examiner* — John W Miller
*Assistant Examiner* — Sean N. Haiem
(74) *Attorney, Agent, or Firm* — Armis IP Law, LLC (57) ABSTRACT

A system includes a primary playback system and a secondary playback system. The primary playback system plays back selected content. The secondary playback system plays back supplemental media associated with the content played back on the primary playback system. A media playback function (such as associated with the secondary playback system) monitors playback of the content on the primary playback system. For example, a first processing thread of the media playback function initially synchronizes playback of supplemental media on the secondary playback system with respect to playback of the content on the primary playback system. Based on further monitoring of playing back the content on the secondary playback system, a second processing thread of the media playback function verifies synchronization (and, when needed, initiates re-synchronization) of playback of the supplemental media on the secondary playback system with respect to playback of the content on the primary playback system.

36 Claims, 7 Drawing Sheets

(56) References Cited

U.S. PATENT DOCUMENTS

| | | | |
|---|---|---|---|
| 2009/0144361 A1* | 6/2009 | Nobakht | G06Q 30/02 |
| | | | 709/203 |
| 2013/0016282 A1* | 1/2013 | Kim | H04N 21/242 |
| | | | 348/521 |
| 2013/0111514 A1* | 5/2013 | Slavin | H04N 21/43079 |
| | | | 725/18 |
| 2014/0125866 A1* | 5/2014 | Davy | H04N 21/43079 |
| | | | 348/462 |
| 2017/0034229 A1* | 2/2017 | Wong | G06F 21/10 |
| 2017/0310926 A1* | 10/2017 | Patel | H04N 21/2662 |
| 2019/0182554 A1* | 6/2019 | Schupak | H04N 21/2187 |
| 2020/0162796 A1* | 5/2020 | Azuolas | H04N 21/23439 |

OTHER PUBLICATIONS

Sara Bastian, "Actiview App Aims to Make Movie-Going More Inclusive and Accessible", Jun. 20, 2017, pp. 2, Technology (Http://Consumersresearch.org/Category/Issues/Technology-Issues).

* cited by examiner

MANIFEST
FILE
148

T0 ...... SEG1 ...... PTR1
T1 ...... SEG2 ...... PTR2
T2 ...... SEG3 ...... PTR3
T3 ...... SEG4 ...... PTR4
T4 ...... SEG5 ...... PTR5

• • •

T100 ...... SEG100 ...... PTR100
T101 ...... SEG101 ...... PTR101
T102 ...... SEG102 ...... PTR102
T103 ...... SEG103 ...... PTR103

• • •

T200 ...... SEG200 ...... PTR200
T201 ...... SEG201 ...... PTR201
T202 ...... SEG202 ...... PTR202
T203 ...... SEG203 ...... PTR203

MEDIA PLAYBACK SYNCHRONIZATION OF MULTIPLE PLAYBACK SYSTEMS

BACKGROUND

Conventional systems support playback of an audio file associated with a movie viewed in a movie theater. For example, a moviegoer can select an audio file associated with a movie being played in the movie theater. The moviegoer downloads the audio file to a mobile communication device operated by the user.

During playback of the movie, via detected audio associated with the movie played back in the movie theater, a conventional application executed on the mobile communication device initially synchronizes with playback of the movie via determining a portion (or playback location) of the movie currently being played back in the theater. After a single initial synchronization, the conventional application on the mobile communication device then plays back portions of the audio file (or text file as the case may be) pertinent to the current played back portion of the movie.

BRIEF DESCRIPTION OF EMBODIMENTS

Embodiments herein provide novel ways of synchronizing playback of supplemental media on such a secondary playback system with respect to playback of selected content on a primary playback system.

More specifically, a media playback environment includes a primary playback system and a secondary playback system. In one embodiment, the secondary playback system is disparately located with respect to the primary playback system. A user selects a specific title of content for playback on/by the primary playback system. The secondary playback system receives notification of the content selected for play back on the primary playback system and downloads supplemental data as specified by the notification to the communication system.

In accordance with control input the user, the primary playback system plays back the title of content selected by the user at a selected location. Via a so-called trick play mode of controlling playback of the selected title of content on the primary playback system, the user can control playback of the selected title of content via application of different commands such as play, pause, fast forward, rewind, etc.

The secondary playback system monitors a current location of the primary playback system playing back the selected content. Based on current playback location of playing back the content on the primary playback system, which may change due to application of different playback commands (such as pause, rewind, fast forward, etc.), a playback management application (such as in or associated with the secondary playback system) repeatedly synchronizes playback of supplemental media (such as descriptive audio, closed caption text, etc.) with respect to the playback of the content on the secondary playback system on an as-needed basis.

In one embodiment, the primary playback system uses a manifest file to retrieve different segments of content for display on a display screen of the primary playback system. Initially, the media playback application associated with the secondary playback system synchronizes playback of supplemental media on the secondary playback system with respect to playback of the content on the primary playback system. Based on the monitored playback of the content on the played back, the media playback application verifies synchronization of playback of the supplemental media on the secondary playback system with respect to playback of the content on the primary playback system.

In one embodiment, if the media playback application detects that playback of the supplemental media is out of sync (not synchronized) with respect to playback of the content on the primary playback system during the verifying, the media playback application detects the out of sync condition adjusts a current playback location of playing back the supplemental media on the secondary playback system such that the supplemental media played back on the secondary playback system is again synchronized with the playback of the content on the primary playback system.

Thus, embodiments herein include one or more instances of re-synchronizing playback of the supplemental media on the secondary playback system with respect to playback of the content on the primary playback system in response to detecting that playback of the supplemental media on the secondary playback system is out of sync with respect to playback of the content on the primary playback system greater than a time threshold value. For example, if synchronization is off by less than a threshold level of 250 milliseconds, the secondary playback system may not adjust playback of the supplemental media. Conversely, if synchronization is off by greater less than a threshold level of 250 milliseconds, the secondary playback system does adjust playback of the supplemental media.

In accordance with further example embodiments, the playback of the supplemental media provides an audio or visual description of the content played back on the primary playback system.

In still further example embodiments, monitoring the playback of the content on the primary playback system includes: receiving and monitoring a signal from the primary playback system. The signal indicates a current playback location of the content by the primary playback system. In one embodiment, the signal received from the primary playback system is an audio signal generated from a soundtrack of the content being played back.

The signal associated with playback of the content on the primary playback system can be implemented in any suitable manner. In one embodiment, monitoring playback of the content on the primary playback system includes: obtaining a moving window of time sample of a signal generated by the primary playback system; and mapping the moving window of time sample to a corresponding playback location in the supplemental media. Re-synchronizing playback of the supplemental media on the secondary playback system with respect to playback of the content on the primary playback system includes, among other things, controlling playback of the supplemental media on the secondary playback system at the corresponding playback location derived from the moving window of time sample.

In further example embodiments, the secondary playback system implements a first processing thread and a second processing thread. Via the first processing thread, the media playback application initially synchronizes playback of the supplemental media on the secondary playback system with respect to playback of the content on the primary playback system. Via the second processing thread, the media playback application verifies synchronization of playback of the supplemental media on the secondary playback system with respect to playback of the content on the primary playback system. In certain instances, the second processing thread detects that synchronization is less than a threshold time value in which case, the second processing thread does not do anything. In other instances, the second processing thread detects an out of sync condition greater than a threshold time value in which case, the second processing thread notifies the first processing thread to re-synchronize playback of the supplemental media to playback of the content by the primary playback system.

In other instances, the second processing thread is unable to determine a playback location of playing back the content on the primary playback system. In response to this latter condition, the media playback application discontinues playback of the supplemental media on the secondary playback system.

In further example embodiments, the first processing thread (such as a primary processing thread) of the media playback application derives a first index value (such as initial synchronization value) indicative of a playback location of playing back the main content (title of content) on the primary playback system. The second processing thread of the media playback application derives a second index value indicative (for synchronization verification) of a playback location of playing back the content on the primary playback system. In one embodiment, the second processing thread compares the second index value to the first index value to determine if the secondary playback system and corresponding playback of the supplemental media is out of sync (or in sync) with respect to playback of the content by the primary playback system. In the event of an out of sync condition, and the second processing thread cannot determine synchronization, the second processing thread initiates re-synchronization via communication to the first processing thread.

In one embodiment, in response to detecting that the second index value is out of sync with respect to the first index value and that a difference between the second index value and the first index value is less than a threshold value, the second processing thread of the media playback application uses the second index value as a pointer to playback the supplemental media on the secondary playback system. The second processing thread does not notify the first processing thread of the out of sync condition because the out of sync condition is below a threshold level. Thus, if the playback on the second playback system is only slightly out of sync with respect to the primary playback system, then the system is considered to be sufficiently synchronized.

Embodiments herein are useful over conventional techniques. For example, verification of synchronization and repeated re-synchronization of the secondary playback system with respect to the first playback system as needed ensures that playback of the supplemental media in the secondary playback system tracks playback of the selected title of content on the primary playback system, especially during trick modes.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide efficient use of wireless resources in a network environment. The instructions, when executed by computer processor hardware, cause the computer processor hardware (such as one or more co-located or disparately processor devices or hardware) to: monitor playback of content on a primary playback system; initially synchronize playback of supplemental media on a secondary playback system with respect to playback of the content on the primary playback system; based on further monitoring playback of the content: verify synchronization of playback of the supplemental media on the secondary playback system with respect to playback of the content on the primary playback system; detect that the playback of the supplemental media on the communication system is not synchronized with respect to playback of the content on the playback system; in response to detecting that playback of the supplemental media on the secondary playback system is out of sync with respect to playback of the content on the primary playback system greater than a threshold value, initiate re-synchronization playback of the supplemental media on the communication system with respect to playback of the content on the primary playback system.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a further summary as well as detailed description) and corresponding figures of the present disclosure as further discussed below.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A playback environment includes a primary playback system and a secondary playback system. The primary playback system plays back selected content. The secondary playback system plays back supplemental media associated with the content played back on the primary playback system. A media playback function (such as associated with the secondary playback system and/or primary playback system) monitors playback of the content on the primary playback system.

For example, a first processing thread of the media playback function initially synchronizes playback of supplemental media on the secondary playback system with respect to playback of the content on the primary playback system. Based on further monitoring of playing back the content on the secondary playback system, a second processing thread of the media playback function repeatedly verifies synchronization (and, when needed, initiates re-synchronization) of playback of the supplemental media on the secondary playback system with respect to playback of the content on the primary playback system. In this manner, the media playback function (such as application) maintains synchronization between the primary playback system and the secondary playback system.

Figure 1:
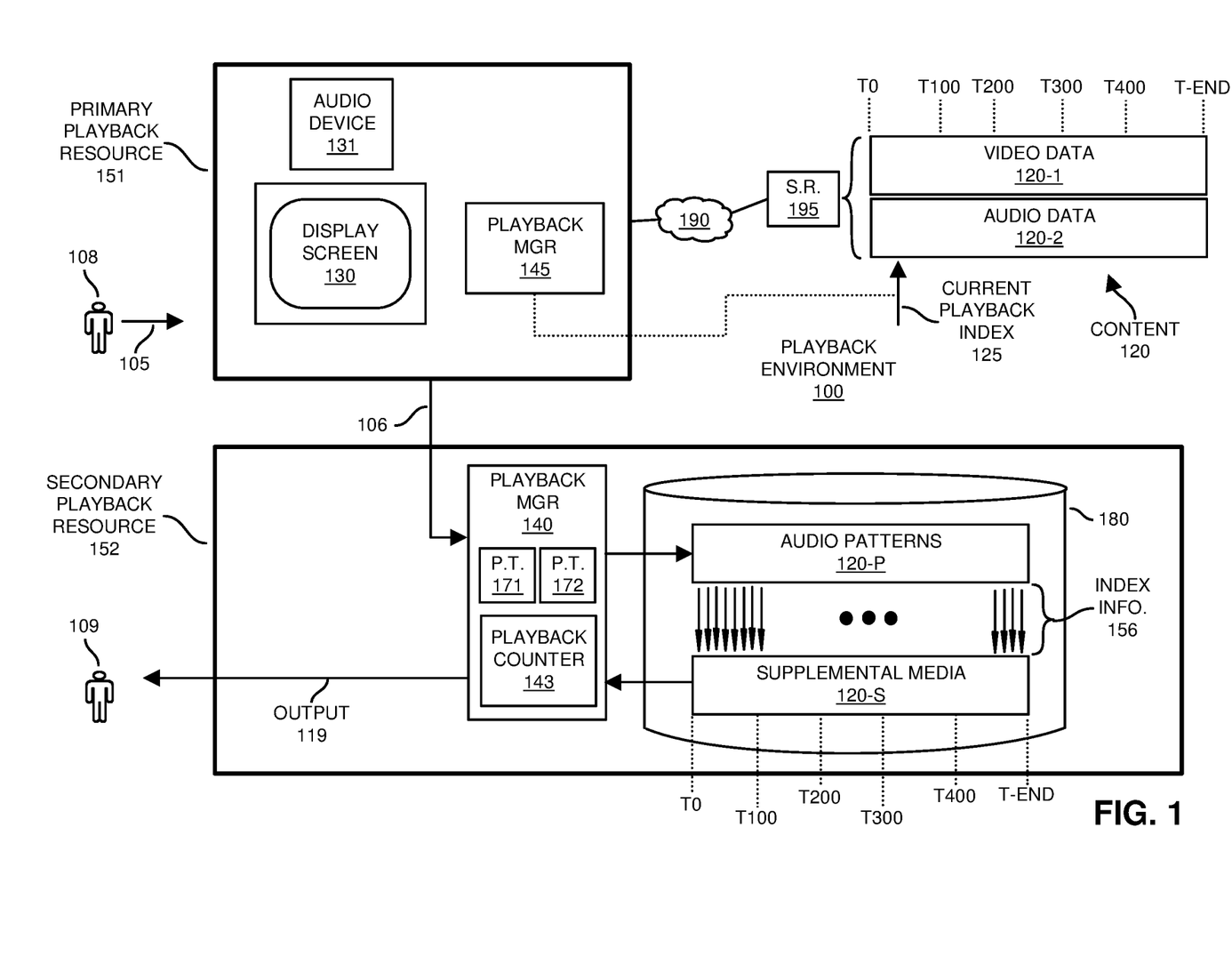
FIG. 1 is an example diagram illustrating multiple playback systems and synchronization of same according to embodiments herein.

Now, more specifically, with reference to the drawings, FIG. 1 is an example diagram illustrating multiple playback systems and corresponding playback synchronization according to embodiments herein.

As shown, playback environment 100 includes primary playback resource 151 (first playback system), secondary playback resource 152 (second playback system), network 190, server resource 195, server resource 196, etc.

Primary playback resource 151 includes display screen 130, audio device 131, and playback manager 145.

Secondary playback resource 152 includes playback manager 145 and repository 180. Playback manager 140 includes processing thread 171 and processing thread 172 to perform different functions.

Note that each of the resources as discussed herein can be configured to operate as hardware, executed software, or a combination of hardware and software.

More specifically, the playback manager 140 as discussed herein can be implemented as playback manager hardware, playback manager software, or a combination of playback manager hardware and playback manager software; the playback manager 145 as discussed herein can be implemented as playback manager hardware, playback manager software, or a combination of playback manager hardware and playback manager software; the primary playback resource 151 as discussed herein can be implemented as primary playback hardware, primary playback software, or a combination of primary playback hardware and primary playback software; the secondary playback resource 152 as discussed herein can be implemented as secondary playback hardware, secondary playback software, or a combination of secondary playback hardware and secondary playback software; and so on.

In one embodiment, the secondary playback resource 152 (a.k.a., primary playback system) is disparately located with respect to the primary playback resource 151 (a.k.a., primary playback system). For example, in one embodiment, the secondary playback resource 152 may be a mobile communication device operated by respective user 109.

In further example embodiments, via control input 105, the user 108 selects respective content 120 for playback on the display screen 130. This can include selection of a symbol displayed on display screen 130, pressing one or more buttons on a remote control device, etc. Thus, in one embodiment, the user 108 operates a respective remote control device that generates input 105 to select playback of the content 120.

Content 120 can be any suitable information. For example, content 120 can be video on demand data, a movie, title of content, television program, show, video data, etc., retrieved for playback on the primary playback resource 151.

In response to receiving a command (such as via input 105) to playback content 120 (such as a specific title of video content), the playback manager 145 retrieves manifest file 148 associated with the selected content 120 from server resource 195 or other suitable entity.

In one embodiment, the primary playback resource 151 and corresponding playback manager 145 use the manifest file 148 as a basis in which to retrieve and playback segments of content associated with the selected content 120.

For example, the manifest file 148 indicates different segments of content associated with content 120 for retrieval from the server resource 195. In one embodiment, the manifest file 148 includes pointers (such as URLs or other suitable information) indicating locations in network 190 from which to retrieve the respective segments associated with content 120 for playback.

In certain instances, the manifest file 148 may offer multiple different bit rates from which the playback manager 145 is able to retrieve segments of content for playback on the playback system (display screen 130 and audio device 131).

Alternatively, note that the primary playback resource 151 can be configured to download the entire file of content and then playback the retrieved file from an appropriate location on display screen 130.

Figure 2:
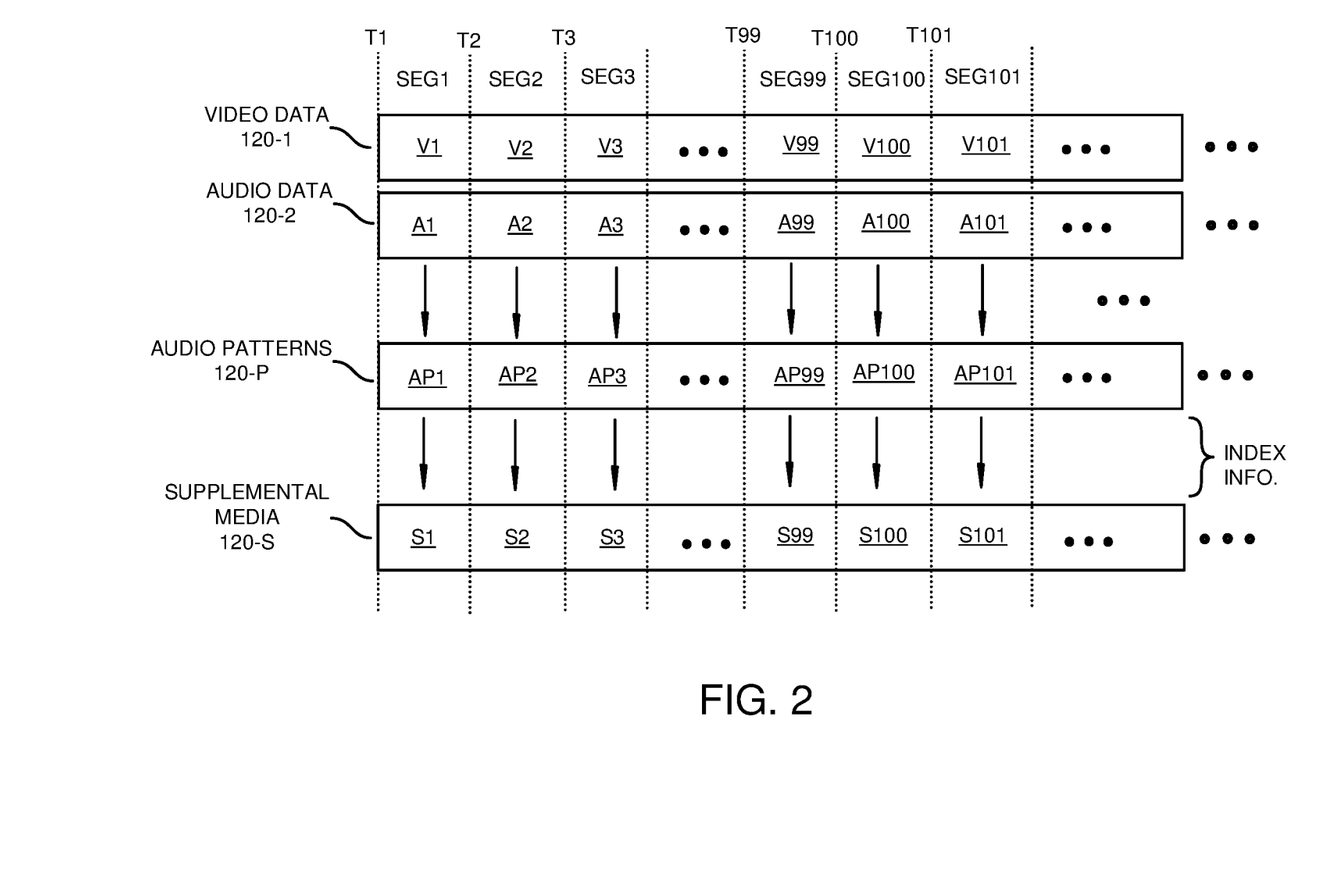
FIG. 2 is an example diagram illustrating mapping of segments of content associated with a title of content to segments of corresponding supplemental media according to embodiments herein.

In still further example embodiments, as further shown in FIG. 2, the content 120 is broken down into discreet, retrievable segments of content 120 that are retrieved and played back by the display screen 130 and the audio device 131.

FIG. 2 is an example diagram illustrating retrievable segments of content and mapping of related data according to embodiments herein.

As shown, the content 120 in this embodiment includes video data 120-1 such as decoded and played back on display screen 130 of primary playback system 151 and audio data 120-2 such as played back on the audio device 131 (such as a speaker) of primary playback system 151.

In this example embodiment, segment SEG1 of content 120 is assigned time stamp T1 and includes video data V1 and audio data A1; segment SEG2 of content 120 is assigned time stamp T2 and includes video data V2 and audio data A2; segment SEG3 of content 120 is assigned time stamp T3 and includes video data V3 and audio data A3; . . . ; segment SEG99 of content 120 is assigned time stamp T99 and includes video data V99 and audio data A99; segment SEG100 of content 120 is assigned time stamp T100 and includes video data V100 and audio data A100; segment SEG101 of content 120 is assigned time stamp 101 and includes video data V101 and audio data A101; and so on.

Note that the video data 120-1 and audio data 120-2 for each of the segments are correlated with each other for simultaneous playback such that sound from the audio device 131 (playing back the supplemental media 120-S) tracks corresponding images on display screen 130.

For example, audio data A1 associated with segment SEG1 includes appropriate audio for playback on audio device 131 (producing sound) during playback of video data V1 (such as images on display screen 130) associated with segment SEG1; audio data A2 associated with segment SEG2 includes appropriate audio for playback on audio device 131 (producing sound) during playback of video data V2 (such as images on display screen 130) associated with segment SEG2; audio data A3 associated with segment SEG3 includes appropriate audio for playback on audio device 131 (producing sound) during playback of video data V3 (such as images on display screen 130) associated with segment SEG3; and so on.

Embodiments herein include implementing technology such as so-called "fingerprinting" and audio synchronization.

For example, in one embodiment, a pre-processing operation includes processing the audio data 120-2 (such as an audio file) associated with content 120 and converting (such as via slicing) it into millions of identifiers, or chunks of identifiable audio patterns. These identifiers (a.k.a., audio patterns) are stored as audio patterns 120-P including audio patterns AP1, AP2, AP3, etc.

In one embodiment, as previously discussed, playback of the audio data A1 results in an audio signal (emanating from audio device 131) as represented by the audio pattern AP1; playback of the audio data A2 results in an audio signal as represented by the audio pattern AP2; playback of the audio data A3 results in an audio signal as represented by the audio pattern AP3; and so on.

In such an instance, playback of corresponding audio associated with the content 120 enables a respective processing entity (such as playback manager 140) to determine a current playback location of the content by the primary playback resource 151.

For example, as previously discussed, the content 120 includes video data V1 that is simultaneously played back with audio data A1. In one embodiment, the playback manager 140 of secondary playback resource 152 monitors output 106 (from primary playback resource 151) such as a playback of audio data A1 associated with the content 120 to determine a current playback location. More specifically, in one embodiment, the playback manager 140 converts the received output 106 (audio playback of audio A1) into a sample audio pattern and compares the detected sample audio pattern associated with detected sample A1 to those stored in the audio patterns 120-P.

Note that the size of the (window) audio pattern sampled by the playback manager 140 can vary. In one embodiment, the playback sample is a moving window of time sample including a pattern associated with playback of respective audio generated by the audio device 131.

Thus, in one embodiment, in order to synchronize playback of supplemental media 120-S with the playback of content 120, a microphone or other suitable sensor device on the secondary playback resource 152 (such as a mobile communication device) receives output 106 (playback of audio associated with audio data 120-2) and records the audio outputted from the audio device 131 associated with playback of content 120. The microphone captures this environmental audio and, in real-time, the playback manager 140 application processes or converts the received signal (such as audio signal) into one or more corresponding audio patterns (such as one or more identifiers). In real-time, the synchronization process implemented by the secondary playback resource 152 compares the detected identifiers (sample pattern from monitoring output 106) against the stored audio patterns 120-1.

In further example embodiments, the degree of likeness between the sample audio pattern and the audio patterns 120-1 may vary. In one embodiment, the playback manager 140 determines a confidence level of matching the detected audio pattern of playing back A1 to one or more of the audio patterns 120-P. In response to detecting that the detected audio pattern confidence level of matching a sample to a corresponding audio pattern in audio patterns 120-P is above a threshold level, indicating a most likely current location of play back in the content 120, the playback manager 140 uses the corresponding index value or timestamp value or pointer (T0 or T1) assigned to the detected audio pattern AP1 to playback appropriate supplemental media 120-S (such as audio description, close captioning, etc.).

Thus, when audio pattern A1 is detected as being played back by the primary playback system, the secondary playback system plays back corresponding supplemental media S1. Additionally, if the monitored signal (such as output 106) from the primary playback resource 151 indicates playback of the audio data A2, the playback manager 140 initiates playback of the supplemental media S2 from supplemental media 120-S; if the monitored signal (such as output 106) from the primary playback resource 151 indicates playback of the audio data A3, the playback manager 140 initiates playback of the supplemental media S3 from supplemental media 120-S; and so on.

In one embodiment, as further discussed herein, the playback manager 140 implements processing thread 171 and processing thread 172 to synchronize playback of the supplemental media 120-S to the playback of video data 120-1 and audio data 120-2. For example, the processing thread 171 synchronizes the playback on an as-needed basis. Processing thread 172 verifies synchronization over time.

Referring again to FIG. 1, embodiments herein further include, via implementation of playback manager 140, playing back supplemental media 120-S associated with content 120 for user 109. As previously discussed, the playback of the supplemental media 120-S depends on a current playback location of the primary playback resource 151 playing back content 120 on display screen 130 and audio device 131 for user 108.

For example, as previously discussed, the user 108 selects a specific title of content (such as content 120) for playback by the primary playback resource 151. In one embodiment, the secondary playback resource 152 receives notification of the selection of the content 120 being played back on the primary playback resource 151.

Alternatively, an entity such as user 108 or user 109 programs the secondary playback resource 152 to playback supplemental media 120-S associated with the selected content 120. For example, the user 108 or user 109 notifies the secondary playback resource 152 that content 120 has been selected for playback on the primary playback resource 151 or the user 108/user 109 selects the supplemental media 120-S associated with the content 120 for playback on the secondary playback resource 152.

In one embodiment, the user 108 or user 109 downloads the companion information (supplemental media 120-S such as a media file) associated with the selected content 120 from a server or other suitable entity over network 190 to the repository 180.

In a manner as previously discussed, the primary playback resource 151 plays back the selected content 120 on display screen 130 and audio device 131. Via signal 106 received from the primary playback resource 151, the secondary playback resource 152 monitors progress of the primary playback resource 151 playing back the selected content 120. As previously discussed, the signal 106 indicates a current playback location of the primary playback resource 151 playing back the content 120.

Based on detected progress indicative of a current playback location of the playback manager 145 playing back the content 120, the playback manager 140 (such as in or associated with the secondary playback system) synchronizes playback of supplemental media (such as descriptive audio, closed caption text, etc.) associated with the content 120 on the secondary playback system operated by a user.

Note that the output 119 can be any suitable perceptible signal such as text, images, audio (such as audio describing the images and corresponding video, actual video associated with the title of content), etc., played back on the secondary playback resource 152.

In one embodiment, as previously discussed, the primary playback resource uses the manifest file 148 to retrieve different segments of content for display on a display screen 130 and playback of audio on audio device 131 of the primary playback resource 151. An example of the manifest file 148 is shown in FIG. 3.

Figure 3:
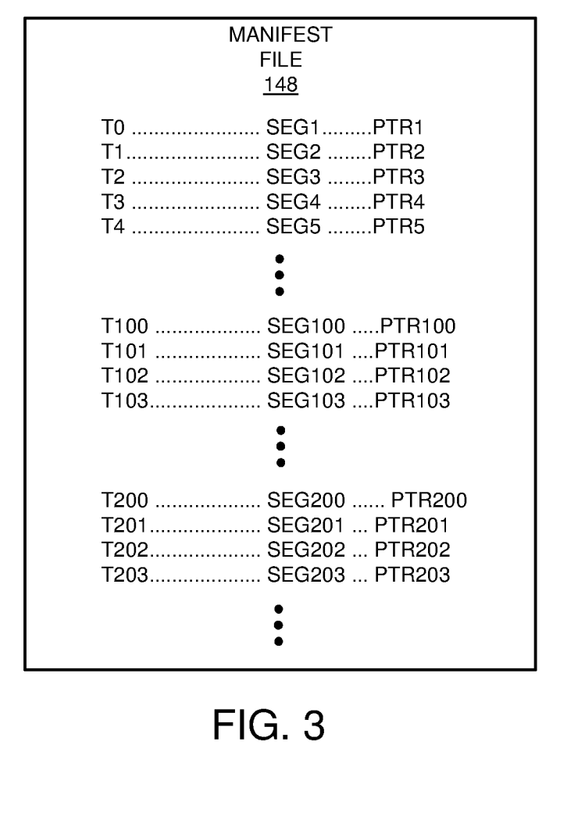
FIG. 3 is an example diagram illustrating a manifest file indicating a schedule of retrieving segments of content for playback by a primary playback system according to embodiments herein.

FIG. 3 is an example diagram illustrating a manifest file according to embodiments herein.

As previously discussed, in one embodiment, the primary playback resource 151 and corresponding playback manager 145 use the manifest file 148 to retrieve the different segments of content for playback on the primary playback resource 151. For example, the pointer PTR1 points to a location from which to retrieve segment SEG1; the pointer PTR2 points to a location from which to retrieve segment SEG2; the pointer PTR3 points to a location from which to retrieve segment SEG3; and so on. Depending on a current playback location, the primary playback system (resource 151) uses a respective pointer to retrieve appropriate content for playback non display screen 130 and audio device 131.

Figure 4:
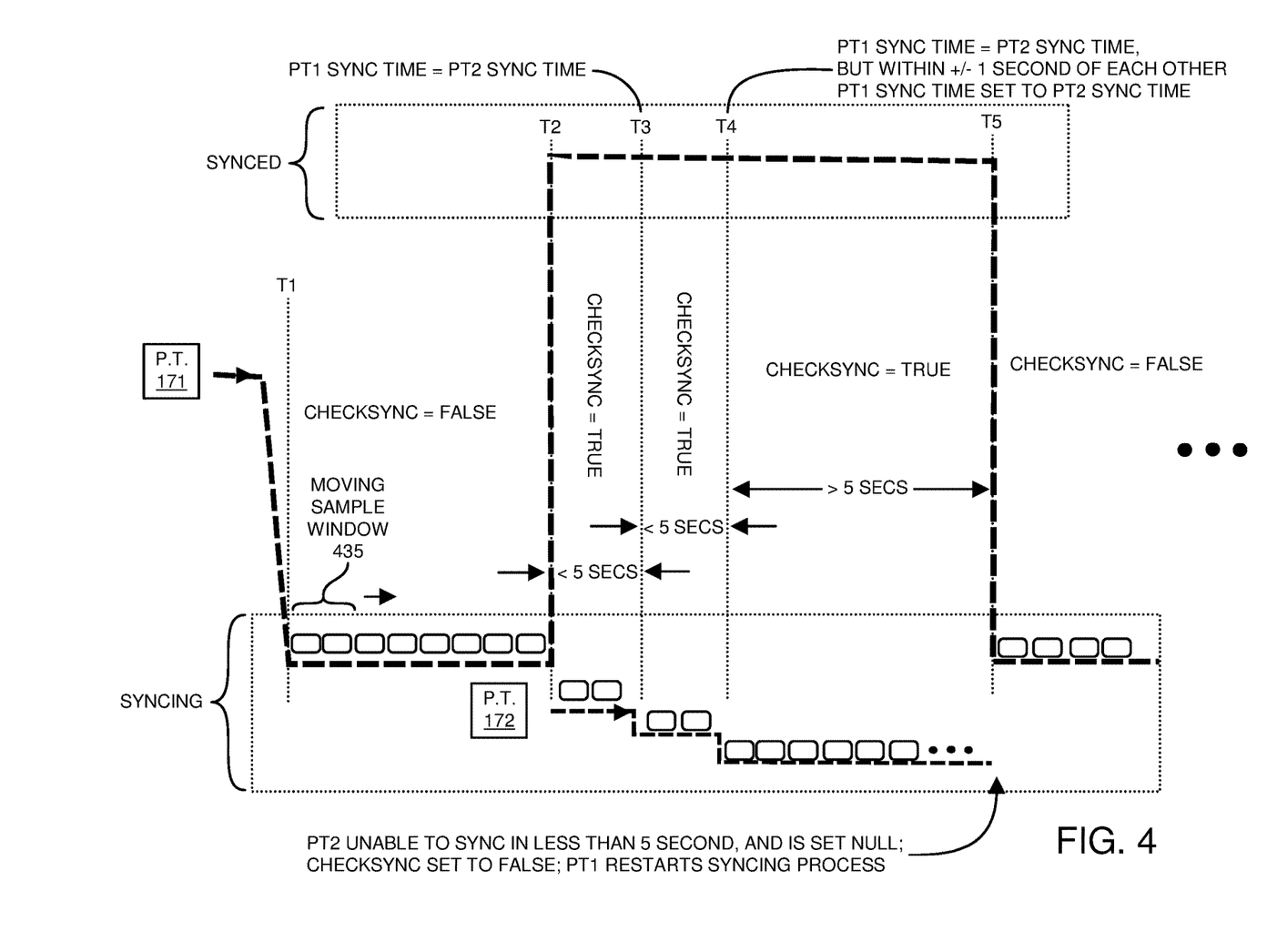
FIG. 4 is an example flowchart diagram illustrating implementation of multiple processing threads to control playback of supplemental media according to embodiments herein.

FIG. 4 is an example flowchart diagram illustrating implementation of multiple processing threads to verify and update synchronization of playing back supplemental media on a secondary playback system with respect to playback of main content on a primary playback system according to embodiments herein.

In this example embodiment, the timing diagram 400 illustrates synchronized operation of playing back content 120 (video data 120-1 and audio data 120-2) and corresponding supplemental media 120-S over time.

For example, the primary playback resource 151 starts playing back the content 120 at segment SEG1 at playback time T1. During initial synchronization at or around playback time T1, the processing thread 171 (a.k.a., processing thread PT1) of playback manager 140 samples the signal 106 via moving sample window.

In this example embodiment, the playback manager 140 detects playback of the segment SEG1 (via detected audio pattern AP1) of content 120 and sets the PT1 SYNCTIME=time stamp value to T1. As previously discussed, the PT1 SYNCTIME then increments over time subsequent to initial synchronization. The processing thread 171 notifies processing thread 172 of the setting of PT1 SYNCTIME. The processing thread 172 then sets PT2 SYNCTIME to the same value as PT1 SYNCTIME. Both PT1 SYNCTIME and PT2 SYNCTIME are incremented over time, thus tracking each other.

At or around time T2-T3, the processing thread 170-2 (a.k.a., processing PT2) verifies (checks) whether the PT1 SYNCTIME is correct in which the secondary playback system 152 is synchronized with the primary playback system 151. For example, the processing thread 172 receives a sample of signal 106 and produces a respective sample audio pattern in a manner as previously discussed. The processing thread 172 matches the recent sample audio pattern to a respective audio pattern in the audio patterns 120-P to determine a current playback location (index or time value) of the video data 120-1 and audio data 120-2.

In this example embodiment, since the current playback index for the sample (between time T2 and T3) matches the value stored in PT1 SYNCTIME, then the processing thread 172 at or around time T3 sets CHECKSYNC=TRUE, indicating that the playback of the supplemental media 120-S via playback manager 140 is synchronized with playback of the segments of content 120 by playback manager 145.

At or around time T3-T4, the processing thread 170-2 (a.k.a., processing PT2) verifies (checks) whether the PT1 SYNCTIME is correct in which the secondary playback system 152 is synchronized with the primary playback system 151. For example, the processing thread 172 receives another sample of signal 106 between time T3 and T4 and produces a respective sample audio pattern. The processing thread 172 matches the sample audio pattern to a respective audio pattern in the audio patterns 120-P to determine a current playback location (index or time value) of the video data 120-1 and audio data 120-2.

If the current playback time index for the sample does not identically match the time index value stored in PT1 SYNC-TIME, but there is a time difference of the time index value associated with the recent sample is within a threshold value such as one second or less of the current time index value stored in the PT1 SYNCTIME, then the processing thread 172 sets both the PT2 SYNCTIME and PT1 SYNCTIME to the time index value associated with the latest sample by processing thread 172. The processing thread 172 sets CHECKSYNC=TRUE, indicating that the playback of the supplemental media 120-S via playback manager 140 is synchronized with playback of the content by playback manager 145.

At or around time T4-T5, the processing thread 170-2 (a.k.a., processing PT2) verifies (checks) whether the PT1 SYNCTIME is correct in which the secondary playback system 152 is synchronized with the primary playback system 151. For example, the processing thread 172 receives one or more additional samples of signal 106 between time T4 and T5 and produces a respective sample audio pattern. The processing thread 172 attempts to matches the sample audio pattern to a respective audio pattern in the audio patterns 120-P to determine a current playback location (index or time value) of the video data 120-1 and audio data 120-2.

In this instance, assume that the processing thread 172 is unable to determine a current playback time index value associated with the sampled output 106 such as at or around playback time T4 to T5. In response to this condition, the processing thread 172 (such as after 5 seconds) sets CHECKSYNC=FALSE. In response to the CHECKSYNC=FALSE condition, the processing thread 171 then monitors the output 106 again to identify a current playback location of the content 120.

Thus, embodiments herein include implementing a first processing thread 171 to determine an initial playback index associated with playback of content 120. The second processing thread 172 is a background task of verifying synchronization and updating same if the synchronization difference is below a threshold level.

Figure 5:
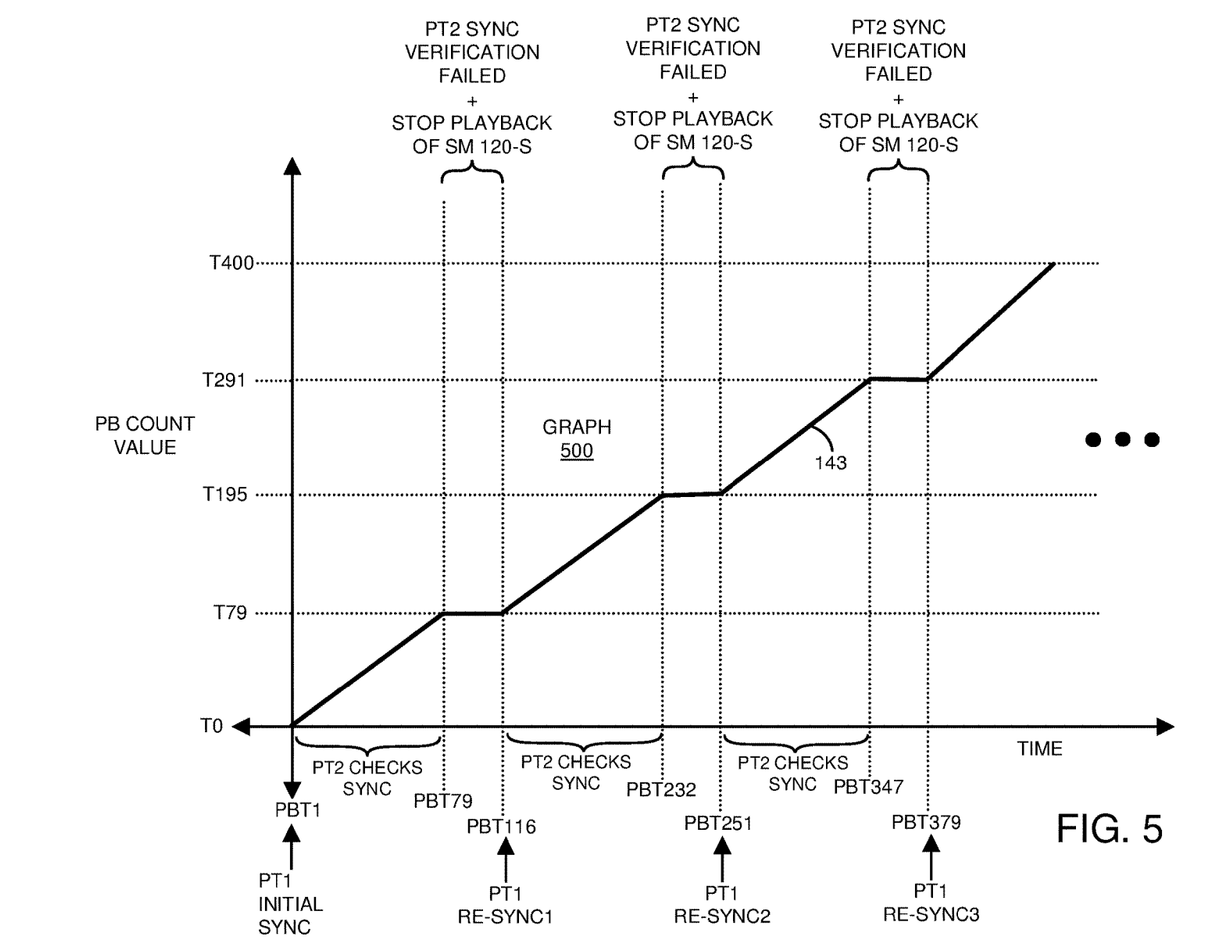
FIG. 5 is an example timing diagram illustrating playback of content and corresponding supplemental media according to embodiments herein.

FIG. 5 is an example timing diagram illustrating according to embodiments herein.

In this example embodiment, the timing diagram (graph 500) illustrates synchronized operation of playing back content 120 and corresponding supplemental media 120-S over time.

For example, the primary playback resource 151 starts playing back the content 120 at segment SEG1 at playback time PBT1. During initial synchronization at or around playback time PBT1, the processing thread 171 (a.k.a., processing thread PT1) of playback manager 140 detects playback of the segment SEG1 (via detected audio pattern AP1) of content 120 and sets the PT1 SYNCTIME=time stamp value of T1. As previously discussed, the PT1 SYNCTIME then increments over time subsequent to playback time PBT1. The processing thread 171 notifies processing thread 172 of the setting of PT1 SYNCTIME. The processing thread 172 then sets PT2 SYNCTIME to the same value as PT1 SYNCTIME. Both PT1 SYNCTIME and PT2 SYNCTIME are incremented over time to track each other.

Further, as previously discussed, the playback manager 140 uses the current value of the PT1 SYNCTIME in which to playback corresponding supplemental media 120-S. In such an instance, at or around playback time PBT1, the playback manager 145 initiates playback of video data V1 and audio data A1 while the playback manager 140 plays back supplemental media S1; at or around playback time PBT2, the playback manager 145 initiates playback of video data V2 and audio data A2 while the playback manager 140 plays back supplemental media S2; at or around playback time PBT3, the playback manager 145 initiates playback of video data V3 and audio data A3 while the playback manager 140 plays back supplemental media S3; and so on.

Thus, between time PBT1 and PBT79 in this example, the playback manager 145 plays back segments SEG1 to SEG79. Playback manager 140 synchronously plays back corresponding supplemental media 120-S including segments S1 to S79.

Additionally, in a manner as previously discussed, between time PBT1 and PBT79, the processing thread 170-2 (a.k.a., processing PT2) verifies (checks) whether the PT1 SYNCTIME is correct in which the secondary playback system 152 is synchronized with the primary playback system 151. For example, the processing thread 172 receives a sample of signal 106 and produces a respective sample audio pattern. The processing thread 172 matches the sample audio pattern to a respective audio pattern in the audio patterns 120-P to determine a current playback location (index or time value) of the video data 120-1 and audio data 120-2.

If the current playback index for the sample matches the value stored in PT1 SYNCTIME, then the processing thread 172 sets CHECKSYNC=TRUE, indicating that the playback of the supplemental media 120-S via playback manager 140 is synchronized with playback of the c by playback manager 145.

If the current playback time index for the sample does not identically match the time index value stored in PT1 SYNCTIME, but a time difference of the time index value associated with the sample is within a threshold value such as one second of the current time index value stored in the PT1 SYNCTIME, then the processing thread 172 sets both the PT2 SYNCTIME and PT1 SYNCTIME to the time index value associated with the latest sample. The processing thread 172 sets CHECKSYNC=TRUE, indicating that the playback of the supplemental media 120-S via playback manager 140 is synchronized with playback of the c by playback manager 145. The playback manager 140 uses the value PT1 SYNCTIME of PT2 SYNCTIME as a basis in which to playback corresponding supplemental media 120-S.

If the processing thread 172 is unable to determine a current playback time index value associated with the sampled output 106 such as at or around playback time PBT79 (such as because playback of the content 120 is paused by playback manager 145), the processing thread 172 (such as after 5 seconds) sets CHECKSYNC=FALSE. In such an instance, the processing thread 171 then monitors the output 106 again to identify a current playback location of the content 120.

In one embodiment, the inability of the processing threads to acquire synchronization at or around playback time PBT79 to PBT116 occurs because the user 108 paused playback of the content by primary playback system 171.

The processing thread 171 attempts to determine a current playback location of the content 120 by the primary playback system 151. Because the playback of content is paused between playback time PBT79 and PBT116, the processing thread 171 is unable to obtain synchronization again until around time PBT116, when the playback manager 145 plays back the content starting at or around time index T80. At such time of obtaining synchronization again (RE-SYNC1 at playback time PBT116) around time PBT116, the processing thread 171 sets CHECKSYNC=TRUE.

After playback time PBT116 and synchronization by the processing thread 171, in a manner as previously discussed, the (background) processing thread 172 repeatedly verifies that the playback of the supplemental media 120-S is synchronized with playback of the content 120 in a manner as previously discussed. Processing thread 171 sets the PT1 SYNCTIME to the appropriate time index value of current playback.

For example, between time PBT116 and PBT232, the playback manager 145 plays back segments SEG80 to SEG195. Playback manager 140 synchronously plays back corresponding supplemental media 120-S including segments S80 to S195.

Additionally, between time PBT116 and PBT232, the processing thread 170-2 (a.k.a., processing PT2) verifies (checks) whether the current PT1 SYNCTIME is correct in which the secondary playback system 152 is synchronized with the primary playback system 151. For example, the processing thread 172 receives a sample of signal 106 and produces a respective sample audio pattern. The processing thread 172 matches the sample audio pattern to a respective audio pattern in the audio patterns 120-P to determine a current playback location (index or time value) of the video data 120-1 and audio data 120-2.

If the current playback index for the sample matches the value stored in PT1 SYNCTIME, then the processing thread 172 sets CHECKSYNC=TRUE, indicating that the playback of the supplemental media 120-S via playback manager 140 is synchronized with playback of the c by playback manager 145.

If the current playback time index for the sample does not identically match the time index value stored in PT1 SYNCTIME, but a time difference of the time index value associated with the sample is within a threshold value such as one second of the current time index value stored in the PT1 SYNCTIME, then the processing thread 172 sets both the PT2 SYNCTIME and PT1 SYNCTIME to the time index value associated with the latest sample. The processing thread 172 sets CHECKSYNC=TRUE, indicating that the playback of the supplemental media 120-S via playback manager 140 is synchronized with playback of the content by playback manager 145.

If the processing thread 172 is unable to determine a current playback time index value associated with the sampled output 106 such as at or around playback time PBT232, the processing thread 172 (such as after 5 seconds) sets CHECKSYNC=FALSE. In such an instance, the processing thread 171 then monitors the output 106 again to identify a current playback location of the content 120.

In one embodiment, the inability of the processing threads to acquire synchronization at or around playback time PBT232 to PBT251 occurs because the user 108 paused playback of the content by primary playback system 171.

The processing thread 171 attempts to determine a current playback location of the content 120 by the primary playback system 151 between PBT232 and PBT251. Because the playback of content is paused between playback time PBT232 and PBT251, the processing thread 171 is unable to obtain synchronization again until around time PBT152, when the playback manager 145 plays back the content starting at or around time index T95. At such time of obtaining synchronization again (RE-SYNC2 at playback time PBT251), the processing thread 171 sets CHECKSYNC=TRUE.

In this manner, the playback manager 140 and corresponding processing threads maintain synchronous playback of the supplemental media 120-S with respect to playback of the content 120 (video data 120-1 and audio data 120-2).

Figure 6:
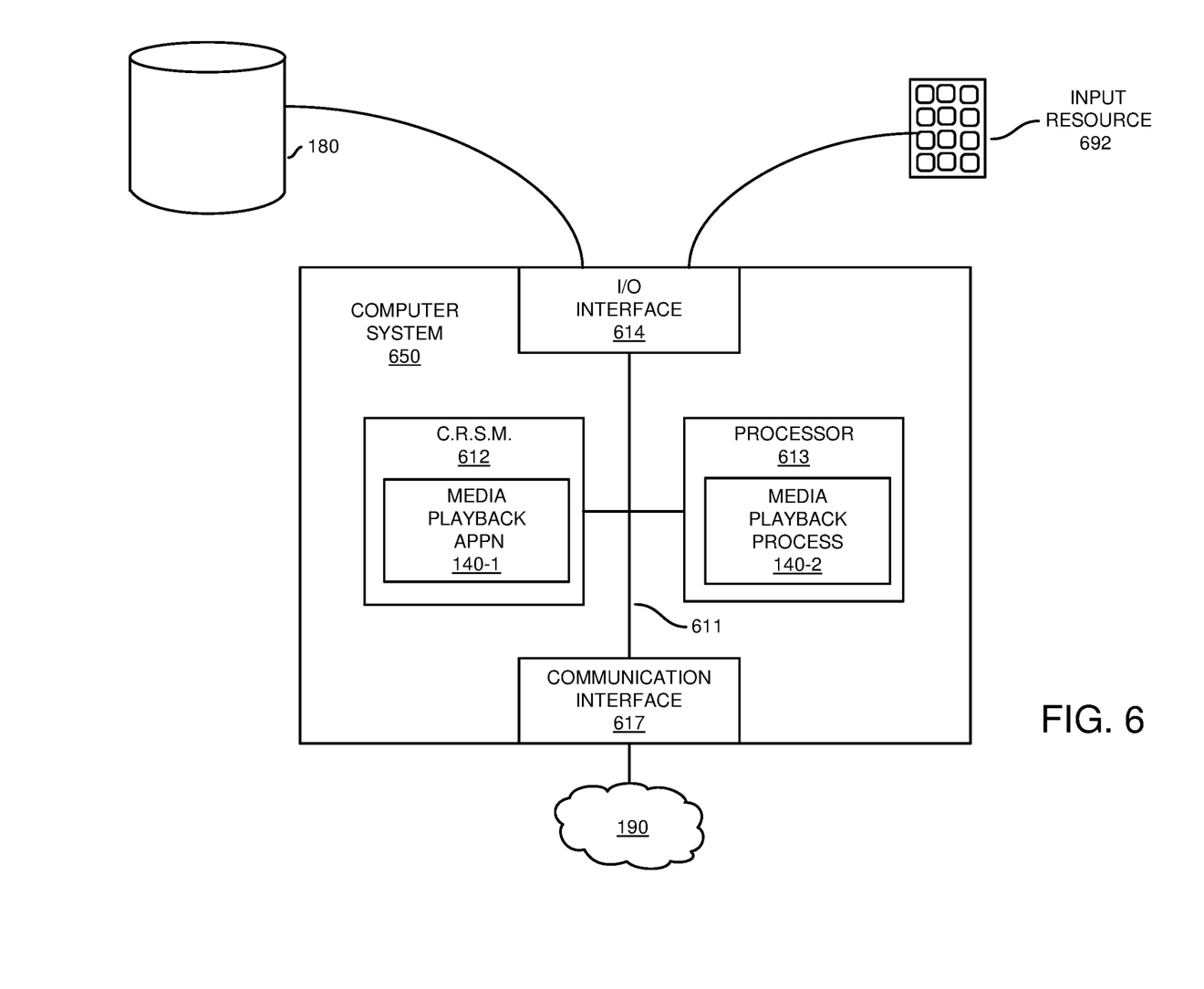
FIG. 6 is an example diagram illustrating example computer architecture operable to execute one or more operations according to embodiments herein.

FIG. 6 is an example block diagram of a computer system for implementing any of the operations as previously discussed according to embodiments herein.

Any of the resources (such as primary playback resource 151, secondary playback resource 152, primary playback system, secondary playback system, playback manager 145, playback manager 140, processing thread 171, processing thread 172, etc.) as discussed herein can be configured to include computer processor hardware and/or corresponding executable instructions to carry out the different operations as discussed herein.

As shown, computer system 650 of the present example includes an interconnect 611 that coupling computer readable storage media 612 such as a non-transitory type of media (which can be any suitable type of hardware storage medium in which digital information can be stored and retrieved), a processor 613 (computer processor hardware), I/O interface 614, and a communications interface 617.

I/O interface(s) 614 supports connectivity to repository 680 and input resource 692.

Computer readable storage medium 612 can be any hardware storage device such as memory, optical storage, hard drive, floppy disk, etc. In one embodiment, the computer readable storage medium 612 stores instructions and/or data.

As shown, computer readable storage media 612 can be encoded with media playback application 140-1 (e.g., including instructions) to carry out any of the operations as discussed herein.

During operation of one embodiment, processor 613 accesses computer readable storage media 612 via the use of interconnect 611 in order to launch, run, execute, interpret or otherwise perform the instructions in media playback application 140-1 (such as executed by the playback manager 140, playback manager 145, etc.) stored on computer readable storage medium 612. Execution of the media playback application 140-1 produces media playback process 140-2 to carry out any of the operations and/or processes as discussed herein.

Those skilled in the art will understand that the computer system 650 can include other processes and/or software and hardware components, such as an operating system that controls allocation and use of hardware resources to execute media playback application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 7. Note that the steps in the flowcharts below can be executed in any suitable order.

Figure 7:
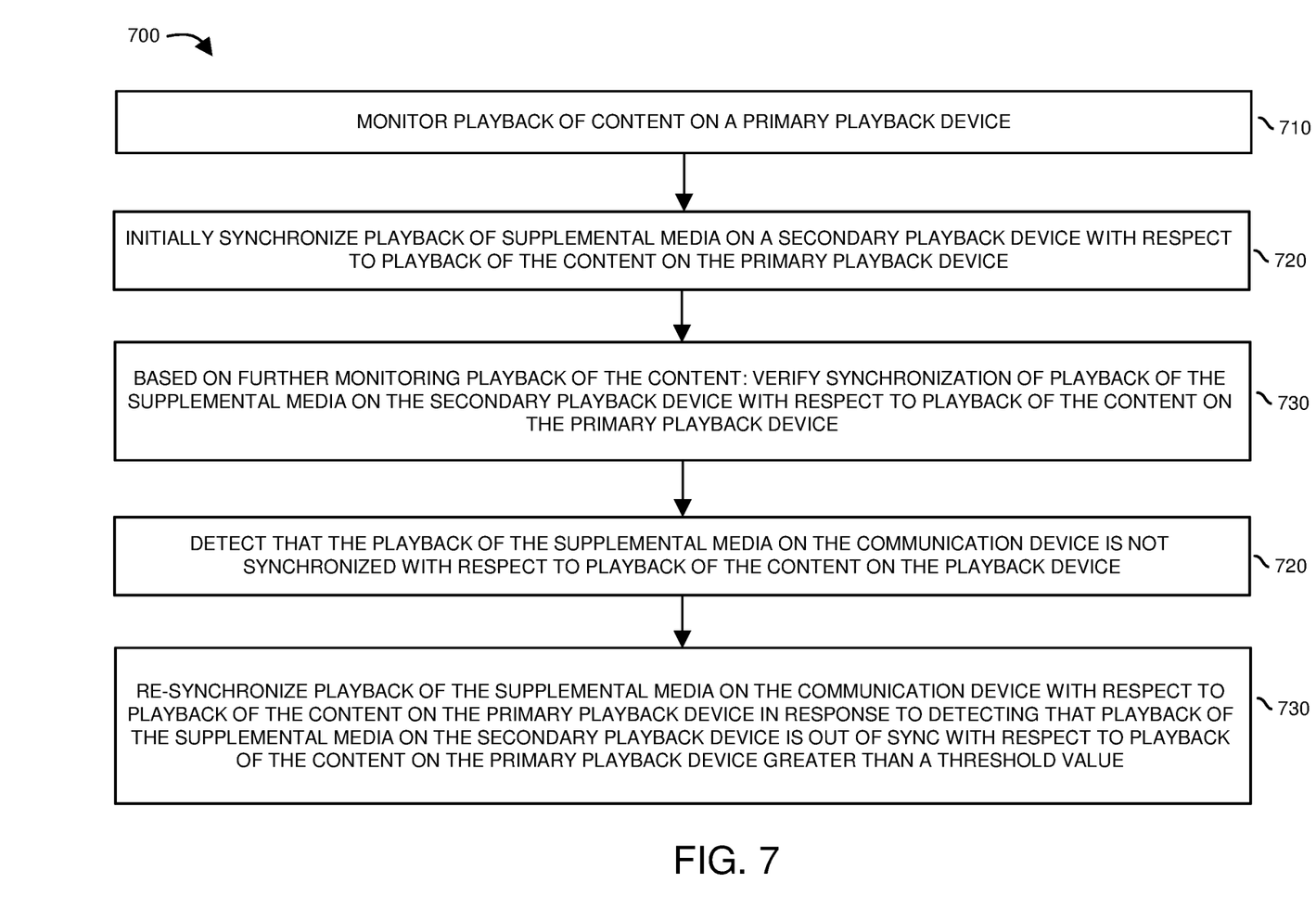
FIG. 7 is an example diagram illustrating a method according to embodiments herein.

FIG. 7 is a flowchart 700 illustrating an example method according to embodiments. Note that there will be some overlap with respect to concepts as discussed above.

In processing operation 710, the playback manager 140 monitors playback of content 120 (video data 120-1 and/or audio data 120-2) on the primary playback system 151.

In processing operation 720, the playback manager 140 initially synchronizes playback of supplemental media 120-S on the secondary playback system 152 with respect to playback of the content 120 on the primary playback system 151.

In processing operation 730, based on further monitoring playback of the content 120: the playback manager 140 verifies synchronization of playback of the supplemental media 120-S on the secondary playback system 152 with respect to playback of the content 120 on the primary playback system 151.

In processing operation 740, the playback manager 140 detects that the playback of the supplemental media 120-S on the secondary playback system 152 is not synchronized with respect to playback of the content 120, but synchronization is within a threshold level.

In processing operation 750, the playback manager 140 re-synchronizes playback of the supplemental media 120-S on the secondary playback system 152 with respect to playback of the content 120 on the primary playback system 151 in response to detecting that playback of the supplemental media 120-S on the secondary playback system 152 is out of sync with respect to playback of the content 120 on the primary playback system 151 greater than a threshold value.

Note again that techniques herein are well suited to facilitate synchronization and re-synchronization of playing back supplemental media associated with playback of primary content. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
monitoring playback of content on a primary playback system;
initially synchronizing playback of supplemental media on a secondary playback system with respect to playback of the content on the primary playback system; and
repeatedly verifying synchronization of playback of the supplemental media on the secondary playback system with respect to playback of the content on the primary playback system, the method further comprising:
via a first processing thread, deriving a first index value indicative of a playback location of playing back the content on the primary playback system;
via a second processing thread, deriving a second index value indicative of the playback location of playing back the content on the primary playback system;
incrementing the first index value over time; and
wherein verifying synchronization includes comparing the second index value to the incremented first index value.

2. The method as in claim 1, wherein monitoring the playback of the content on the primary playback system includes:
receiving a signal from the primary playback system, the signal indicative of a current playback location of the content by the primary playback system.

3. The method as in claim 2, wherein the signal is an audible signal outputted from the primary playback system to a first user watching playback of a rendition of the content on a display screen of the primary playback system; and
wherein the secondary playback system is operated by a second user, the secondary playback system operative to output an audible rendition of the supplemental media to the second user.

4. The method as in claim 1 further comprising:
during the verifying, detecting that the playback of the supplemental media on the secondary playback system is not synchronized with respect to playback of the content on the primary playback system.

5. The method as in claim 4 further comprising:
in response to detecting that the playback of the supplemental media on the secondary playback system is not synchronized with respect to playback of the content on the primary playback system, adjusting a current playback location of playing back the supplemental media on the secondary playback system.

6. The method as in claim 1 further comprising:
re-synchronizing playback of the supplemental media on the secondary playback system with respect to playback of the content on the primary playback system in response to detecting that playback of the supplemental media on the secondary playback system is out of sync with respect to playback of the content on the primary playback system being greater than a threshold value.

7. The method as in claim 6, wherein monitoring playback of the content on the primary playback system includes:
obtaining a moving window sample of a signal generated by the primary playback system; and
mapping the moving window sample to a corresponding playback location in the supplemental media.

8. The method as in claim 7, wherein re-synchronizing playback of the supplemental media on the secondary playback system with respect to playback of the content on the primary playback system includes:
controlling playback of the supplemental media on the secondary playback system at the corresponding playback location derived from the moving window sample.

9. The method as in claim 1 further comprising:
via the first processing thread, initially synchronizing playback of the supplemental media on the secondary playback system with respect to playback of the content on the primary playback system; and
via the second processing thread, verifying synchronization of playback of the supplemental media on the secondary playback system with respect to playback of the content on the primary playback system.

10. The method as in claim 9 further comprising:
via the second processing thread, in response to detecting an inability to determine the playback location of playing back the content on the primary playback system, discontinuing playback of the supplemental media on the secondary playback system.

11. The method as in claim 1, further comprising:
in response to detecting that a time difference between the second index value and the incremented first index value is less than a threshold value, using the second index value as a pointer to playback the supplemental media on the secondary playback system.

12. The method as in claim 1, wherein the playback of the supplemental media provides a description of the content played back on the primary playback system.

13. A system comprising:
communication management hardware operative to:
monitor playback of content on a primary playback system;
initially synchronize playback of supplemental media on a secondary playback system with respect to playback of the content on the primary playback system; and
verify synchronization of playback of the supplemental media on the secondary playback system with respect to playback of the content on the primary playback system;
wherein the communication management hardware is further operative to:
via a first processing thread, derive a first index value indicative of a playback location of playing back the content on the primary playback system;
via a second processing thread, derive a second index value indicative of the playback location of playing back the content on the primary playback system;
increment the first index value over time; and
compare the second index value to the incremented first index value.

14. The system as in claim 13, wherein the communication management hardware is further operative to:
receive a signal from the primary playback system, the signal indicative of a current playback location of the content by the primary playback system; and
utilize the signal to verify synchronization of playback of the supplemental media on the secondary playback system with respect to playback of the content on the primary playback system.

15. The system as in claim 14, wherein the signal is an audio signal outputted from the primary playback system.

16. The system as in claim 13, wherein the communication management hardware is further operative to:
in response to the verifying, detect that the playback of the supplemental media on the secondary playback system is not synchronized with respect to playback of the content on the primary playback system.

17. The system as in claim 13, wherein the communication management hardware is further operative to:
adjust a current playback location of playing back the supplemental media on the secondary playback system in response to detecting that the playback of the supplemental media on the secondary playback system is not synchronized with respect to playback of the content on the primary playback system.

18. The system as in claim 13, wherein the communication management hardware is further operative to:
re-synchronize playback of the supplemental media on the secondary playback system with respect to playback of the content on the primary playback system in response to detecting that playback of the supplemental media on the secondary playback system is out of sync with respect to playback of the content on the primary playback system greater than a threshold value.

19. The system as in claim 18, wherein the communication management hardware is further operative to:
obtain a moving window sample of a signal generated by the primary playback system; and
map the moving window sample to a corresponding playback location in the supplemental media.

20. The system as in claim 19, wherein the communication management hardware is further operative to:
control playback of the supplemental media on the secondary playback system at the corresponding playback location derived from the moving window sample.

21. The system as in claim 13, wherein the communication management hardware is further operative to:
via the first processing thread, initially synchronize playback of the supplemental media on the secondary playback system with respect to playback of the content on the primary playback system; and
via the second processing thread, verify synchronization of playback of the supplemental media on the secondary playback system with respect to playback of the content on the primary playback system.

22. The system as in claim 21, wherein the communication management hardware is further operative to:
   via the second processing thread, in response to detecting an inability to determine a playback location of playing back the content on the primary playback system, discontinue playback of the supplemental media on the secondary playback system.

23. The system as in claim 13 further comprising:
   in response to detecting that a time difference between the second index value and the incremented first index value is less than a threshold value, use the second index value as a pointer to playback the supplemental media on the secondary playback system.

24. The system as in claim 13, wherein the playback of the supplemental media provides a description of the content played back on the primary playback system.

25. Computer-readable storage hardware having instructions stored thereon, the instructions, when carried out by computer processor hardware, cause the computer processor hardware to:
   monitor playback of content on a primary playback system;
   initially synchronize playback of supplemental media on a secondary playback system with respect to playback of the content on the primary playback system; and
   verify synchronization of playback of the supplemental media on the secondary playback system with respect to playback of the content on the primary playback system;
   wherein the computer processor hardware is further operative to:
      via a first processing thread, derive a first index value indicative of the playback location of playing back the content on the primary playback system;
      via a second processing thread, derive a second index value indicative of a playback location of playing back the content on the primary playback system;
      increment the first index value over time; and
      compare the second index value to the incremented first index value.

26. The method as in claim 1, wherein the content played back by the primary playback system includes images displayed on a display screen of the primary playback system; and
   wherein the playback of the supplemental media provides a description of the images displayed on the display screen of the primary playback system.

27. The method as in claim 1, further comprising:
   in response to detecting that a time difference between the second index value and the incremented first index value is greater than a threshold value, temporarily discontinuing playback of the supplemental media on the secondary playback system.

28. The method as in claim 1 further comprising:
   via the first processing thread, tracking the first index value indicative of the playback location of playing back the content on the primary playback system; and
   via a second processing thread, checking synchronization of the secondary playback system playing back the supplemental media with respect to the playback of the content on the primary playback system.

29. The method as in claim 1, wherein the primary playback system is operated by a first user to playback the content; and
   wherein the secondary playback system is operated by a second user to playback the supplemental media.

30. The method as in claim 1, wherein the primary playback system includes a display screen displaying images associated with the content played back by the primary playback system; and
   wherein the secondary playback system outputs an audible signal, the audible signal descriptive of the images displayed on the display screen of the primary playback system.

31. The method as in claim 30 further comprising:
   discontinuing playback of the supplemental media in response to detecting that the primary playback system discontinues playback of the content.

32. The method as in claim 30, wherein the primary playback system is operated by a first user; and
   wherein the secondary playback system is operated by a second user playing back the supplemental media.

33. The method as in claim 1, wherein playback of the content on the primary playback system includes: i) display of images associated with the content on a display screen of the primary playback system to a first user, and ii) output of a sound signal associated with the content from the primary playback system to the first user, the method further comprising:
   outputting an audible signal from the secondary playback system, the audible signal being descriptive of the images displayed on the display screen of the primary playback system.

34. The method as in claim 33, wherein repeatedly verifying synchronization includes: temporarily discontinuing playback of the supplemental media in response to detecting the primary playback system discontinuing playback of the content, the method further comprising:
   resuming playback of the supplemental media on the secondary playback system in response to detecting resumption of playback of the content by the primary playback system.

35. The method as in claim 1, wherein repeatedly verifying synchronization includes:
   receiving a perceptible signal outputted from the primary playback system to a first user, the perceptible signal corresponding to playback of a first segment of the content by the primary playback system;
   converting a sample of the perceptible signal to a first sample audio pattern;
   mapping the first sample audio pattern to a first segment of the supplemental media corresponding to the first segment of content; and
   detecting that the secondary playback system simultaneously plays back the first segment of the supplemental media while the primary playback system plays back the first segment of the video content.

36. The method as in claim 35, wherein the primary playback system includes a display screen displaying images associated with the first segment of content; and
   wherein the secondary playback system outputs an audible signal based on playback of the first segment of the supplemental media, the audible signal descriptive of the images associated with the first segment of content displayed on the display screen of the primary playback system.

* * * * *

UNITED STATES PATENT AND TRADEMARK OFFICE
CERTIFICATE OF CORRECTION

PATENT NO. : 11,570,505 B2
APPLICATION NO. : 17/352567
DATED : January 31, 2023
INVENTOR(S) : Cristian G. Vyhmeister, Horatio Derrick Kipchoge Boothe and John Sweet It is certified that error appears in the above-identified patent and that said Letters Patent is hereby corrected as shown below:

In the Claims

Claim 25, Line 17, change "the playback" to --a playback--

Claim 25, Line 20, change "a playback" to --the playback--

Signed and Sealed this
Twenty-eighth Day of March, 2023

Katherine Kelly Vidal
*Director of the United States Patent and Trademark Office*